Patented Jan. 12, 1954

2,666,059

UNITED STATES PATENT OFFICE 2,666,059

ANILINOISOQUINOLINES AND PROCESSES OF PREPARING THE SAME

Selby B. Davis, Greenwich, and Stuart D. Willson, Stamford, Conn., assignors to American Cyanamid Company, New York, N. Y., a corporation of Maine No Drawing. Application August 11, 1950, Serial No. 178,988

15 Claims. (Cl. 260—288)

This invention relates to new organic compounds and to processes of preparing the same.

The new organic compounds of the present invention have unusual pharmacological properties in that they show a specific dilating effect on the blood vessels of the kidneys and hence may be used to bring about an increase in renal blood flow and a moderate and gradual lowering of the blood pressure without causing an acute fall in blood pressure or postural hypotension.

The compounds of the present invention may be designated broadly as 1-anilinoisoquinolines and may be represented by the following structural formula:

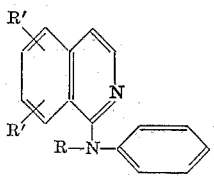

in which R is hydrogen or an alkyl radical, and R' may be the same or different radicals selected from the group of hydrogen, alkyl and alkoxyl radicals.

Compounds having the above formula are generally characterized as being white, crystalline solids when pure. As obtained from the reaction they have a light straw color. They are very soluble in chloroform, ethylene dichloride, trichloroethylene ethanol. They are moderately soluble in methanol and less soluble in ether and benzene. They are insoluble in hexane and related solvents. Acid salts of these compounds may be prepared by simple neutralization. They can be recovered by recrystallization procedures.

Several distinct methods of preparing the new compounds are possible. A process of preparing the preferred compounds of the invention in which R' is an alkoxy radical involves ring closure of 1-(3,4-dialkoxyphenylethyl) - 3 - phenyl ureas to obtain 1-anilino-6,7-dialkoxy-3,4-dihydroisoquinolines (Mohunta and Ray, J. Chem. Soc., 1934, 1263). The product is then dehydrogenated to obtain 1-anilino-6,7-dialkoxyisoquinolines. A detailed description of the preparation of representative compounds of this group by this procedure will be given hereinafter in specific examples. Another process of preparing compounds of the present invention that is preferred when R' in the general formula above is hydrogen comprises the reaction of a 1-haloisoquinoline with aniline or a desired alkyl aniline. Representative examples of this procedure will also be given hereinafter.

Example 1

A solution of 25.00 g. of beta-3,4-dimethoxyphenylethylamine in 50 cc. of benzene was treated with portions of a solution of 16.44 g. of phenylisocyanate in 25 cc. of benzene. The reaction is exothermic and the solution of phenylisocyanate was added fast enough to prevent the formation of a thick slurry. The resulting mixture was chilled for several hours, treated with 25 cc. of benzene-hexane (1:1) and then with 50 cc. of hexane, and filtered. The white solid was washed with four 30 cc. portions of benzene-hexane (1:1) and finally with two 50 cc. portions of petroleum ether. The resulting 1-(3,4-dimethoxyphenylethyl)-3-phenylurea weighed 39.0 g. (94% of theory) and melted at 154.5°–156° C.

35.0 g. of this urea was treated with 45 cc. of phosphorous oxychloride and the resulting mixture heated in a water bath at 90° C. for four hours. Then a 4.5 cc. portion of phosphorous oxychloride was added and the solution heated on the steam bath for two hours. The excess phosphorous oxychloride was removed by distillation at reduced pressure. The residue was treated with 60 cc. of concentrated hydrochloric acid and heated on the steam bath for one hour. The resulting mixture was poured into 800 cc. of water and the cloudy solution was washed with three 250 cc. portions of benzene-chloroform (5:1). The acidic aqueous solution was then made alkaline with sodium hydroxide and extracted with four 300 cc. portions of benzene-chloroform (5:1). The combined organic extracts were filtered, dried over anhydrous potassium carbonate, filtered to remove the drying agent and evaporated to dryness to yield 29.6 g. (90%) of crude 1-anilino-6,7-dimethoxy-3,4-dihydroisoquinoline, melting point 132°–138° C.

A suspension of 1.4 g. of 10% palladium on charcoal in 10 cc. of distilled para-cymene was treated with a hot solution of 5.4 g. of crude dihydro compound in 30 cc. of distilled para-cymene. The suspension was refluxed for five hours in a carbon dioxide atmosphere in a metal bath maintained at 195°–205° C. The hot mixture was filtered to remove the catalyst. The crystals which precipitated on cooling the filtrate were removed by filtration and washed with benzene-hexane and finally with hexane to give 2.50 g. (47%) of crude product, melting point 155°–164° C. Since approximately 30% of the starting material may be recovered from the filtrates by chromatographing on aluminum oxide, the crude yield based on consumed starting material is 67%. Recrystallization of the crude product, melting point 155°–164° C., from 70% methyl alcohol yielded 1.83 g. of pure 1-anilino-6,7-dimethoxy-isoquinoline, melting point 168°–169° C.

The hydrochloride salt of 1-anilino-6,7-dimethoxyisoquinoline may be formed by simple neutralization of the base with hydrochloric acid and may be recovered by crystallization from water in the form of a dihydrate. This compound loses water slowly on a melting point block when heated at 100° C. after which it melts at a temperature of 157°–160° C. Other acid salts may likewise be formed by treatment of the base with an acid.

Various dehydrogenation agents may be used in the above process in addition to 10% palladium on charcoal. Platinum apparently has the same dehydrogenation activity. Raney nickel may also be used as a dehydrogenation agent. The catalysts may be supported on charcoal or asbestos carrying from about 10–30% of the metal. Especially prepared palladium blocks or Adam's platinum oxide is used without carriers. The temperature may range from about 175°–250° C. over a period of time of from one to six hours, in most cases.

The solvent employed in the reaction may be para-cymene, decalin, tetralin, naphthalene, diisopropylbenzene, alpha-methylnaphthalene or the like. Higher temperatures are required if no solvent is used. Air is usually excluded from the reaction by passing in a stream of carbon dioxide or nitrogen.

Sulfur may be used as the dehydrogenation agent by heating the reactants at a temperature of 230°–250° C. for from one to three hours. Although the methoxyl groups are not usually affected certain side reactions may occur and sulfur containing compounds formed. Selenium may be used under some circumstances, 36–48 hours at 300°–330° C., but rearrangements may occur at these temperatures and methoxyl groups split off. Other dehydrogenation or oxidizing agents may be used to oxidize the dihydro compounds employed as intermediates to the aromatic form of the present invention. Potassium permanganate, nitric acid, nitrobenzene and still other similar oxidizing agents will dehydrogenate 3,4-dihydroisoquinolines. Representative examples of the second procedure that may be used to prepare compounds of the present invention will now be given.

Example 2

25 cc. of liquid ammonia containing a few crystals of ferric nitrate was treated, with stirring, with 0.2 g. sodium. After the blue color had turned to gray, 1.00 g. of 1-anilino-6,7-dimethoxyisoquinoline was added. After stirring for ten minutes, 2.0 cc. of ethyl bromide was added and stirring continued for one-half hour. During the next half hour of stirring, 30 cc. of dry toluene was added in portions as the ammonia evaporated. After the ammonia had all evaporated, stirring was continued for another hour and the mixture was then heated on the steam bath for 15 minutes and let stand at room temperature overnight. The mixture was treated with 10 cc. of ethanol and 25 cc. of water and thoroughly shaken in a separatory funnel. The organic layer was removed and the aqueous layer extracted with two 25 cc. portions of benzene. The combined organic layers were filtered and evaporated to dryness. The resulting orange oil was triturated with 25 cc. and three 5 cc. portions of hexane, the procedure each time being to heat the mixture to boiling, let cool to room temperature, and pipette off the hexane solution. The insoluble residue of crude starting material, melting point 162°–167° C., weighed 454 mg. The combined hexane extracts were evaporated to dryness and recrystallized from methanol to give 360 mg. of crude product, melting point 116°–120° C. A further 53 mg., melting point 108°–118° C., was recovered from the methyl alcohol filtrate. Recrystallizations from hexane, methanol and aqueous methanol, including treatment with activated charcoal, yielded 300 mg. of pure 1-(N-ethyl-N-phenylamino)-6,7-dimethoxyisoquinoline (50% yield, based on consumed starting material), melting point 123°–124° C.

Example 3

A mixture of 6.6 g. (0.051 mole) of aniline hydrochloride and 8.4 g. (0.051 mole) of 1-chloroisoquinoline, in 500 cc. of water, was heated at reflux temperature for 5½ hours. After treatment with 1.0 g. of decolorizing charcoal (Darco G-60) the hot solution was filtered. On cooling, a mixture of the mono- and dihydrochlorides of 1-anilinoisoquinoline was precipitated. When filtered and dried the precipitate amounted to 10.4 g., melting point 130°–160° C. The filtrate was made alkaline resulting in the precipitation of 1.26 g. of additional 1-anilinoisoquinoline as the free base, melting point 98°–105° C. A 7.2 g. portion of the mixed hydrochlorides yielded 5.9 g. of the free base, melting point 102°–108° C., when suspended in 100 cc. of hot water and treated with excess sodium hydroxide solution. The total calculated yield of free base amounted to 9.8 g. (87%).

Crystallization of 5.9 g. of the free base from 50 cc. of 75% methanol yielded 5.6 g. of pure 1-anilinoisoquinoline, melting point 110°–111° C.

Example 4

A mixture of 3.6 g. (0.03 mole) of methylaniline and 5.0 g. (0.03 mole) of 1-chlorisoquinoline was heated to 155° C. (bath temperature) in 10 minutes. During the succeeding 20 minutes the temperature was gradually raised to a maximum of 185° C. After cooling, the residue was dispersed in 110 cc. of water and treated with excess sodium hydroxide solution. The precipitate was filtered and dried, yielding 7.0 g. (96%) of crude 1-(N-methyl-N-phenylamino)-isoquinoline, melting point 90°–93° C. A solution of the entire product in 50 cc. of 85% methanol was treated with a small quantity of decolorizing charcoal (Darco G-60) and filtered, yielding 5.0 g. of pure material, melting point 96°–97.5° C.

Examples 5, 6 and 7

The higher homologues, 1-(N-ethyl-, 1-(N-propyl-, and 1-(N-n-butyl-N-phenylamino)isoquinolines were prepared by heating 1-chloroisoquinoline with equimolar portions of ethylaniline, n-propylaniline, and n-butylaniline for 20 minutes at 195°–200° C., 205°–210° C., and 210–215° C., respectively. The crude product obtained, in each case, was freed of a by-product, 1-anilinoisoquinoline, by dissolving in 90% benzene–10% chloroform and passing the solution obtained through a column of activated alumina. Elution of the column with 60% benzene–40% chloroform yielded a relatively pure product, the 1-anilinoisoquinoline remaining on the column. 1(N-ethyl-N-phenylamino)isoquinoline was obtained as the free base, melting point 60°–61° C. 1-(N-n-propyl-N-phenylamino)isoquinoline, an oil, was converted to the hydrochloride, melting point 158°–166° C. 1-(N-butyl-N-phenylamino)isoquinoline, also an oil, was converted to the hydrobromide sesquihydrate, melting point 80° C. (dec.).

As will be apparent from Examples 2 through 7, the process described therein is subject to considerable variation. Solvents may be omitted if desired since the reactants are in liquid form at higher temperatures and act as their own solvent. The reaction is carried out at elevated temperatures of from 50° C. to 250° C., depending upon the boiling point of the solvent and other considerations within the skill of the art. The reaction time will vary with the reactants but may be determined in each case by simple experimentation.

We claim:
1. Compounds of the group consisting of those having the general formula:

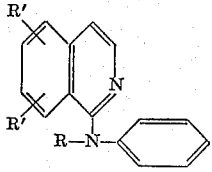

in which R is a member of the group consisting of hydrogen and lower alkyl radicals and R' is selected from the group consisting of hydrogen, and lower alkoxy radicals.

2. Compounds of the group consisting of those having the general formula:

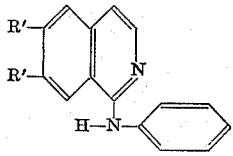

and R' is a lower alkoxy radical.

3. 1-anilino-6,7-dimethoxyisoquinoline.
4. 1-(N-ethyl - N-phenylamino)- 6,7 - dimethoxyisoquinoline.
5. 1-anilinoisoquinoline.
6. 1-(N-methyl-N-phenylamino) isoquinoline.
7. 1-(N-ethyl-N-phenylamino) isoquinoline.
8. A method of preparing compounds having the general formula:

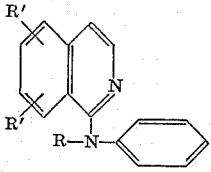

which comprises the step of treating the corresponding 3,4-dihydro form thereof with a dehydrogenating agent, R being a member of the group consisting of hydrogen and lower alkyl radicals and R' being selected from the group consisting of hydrogen and lower alkoxy radicals.

9. A method of preparing compounds having the general formula:

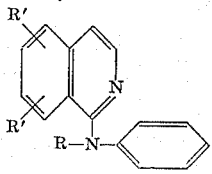

in which R is a member of the group consisting of hydrogen and lower alkyl radicals and R' is selected from the group consisting of hydrogen, and lower alkoxy radicals, which comprises the step of treating the corresponding 3,4-dihydro form thereof with a noble metal dehydrogenating agent.

10. A method of preparing 1-anilino-6,7-dimethoxyisoquinoline which comprises the steps of heating 1-anilino-6,7-dimethoxy-3,4-dihydroisoquinoline with a dehydrogenation catalyst comprising metallic palladium suspended on charcoal in an atmosphere free from oxygen.

11. A method of preparing compounds having the general formula:

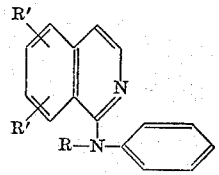

in which R is a member of the group consisting of hydrogen and lower alkyl radicals and R' is selected from the group consisting of hydrogen, and lower alkoxy radicals, which comprises the step of heating a 1-haloisoquinoline having the general formula:

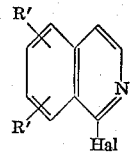

in which R' is as defined above with an amine of the formula:

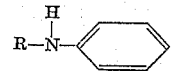

in which R is as defined above.

12. A method of preparing compounds having the general formula:

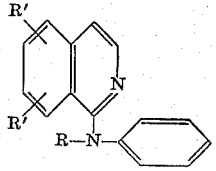

in which R is a member of the group consisting of hydrogen and lower alkyl radicals and R' is selected from the group consisting of hydrogen, and lower alkoxy radicals, which comprises the step of heating at a temperature of at least 50° C. a 1-chloroisoquinoline having the general formula:

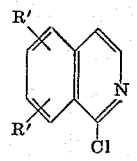

in which R' is as defined above with an amine of the formula:

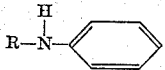

in which R is as defined above.

13. A method of preparing 1-anilino-6,7-dimethoxyisoquinoline which comprises the step of heating 1-chloro-6,7-dimethoxyisoquinoline with aniline.

14. A method of preparing 1-anilinoisoquinoline which comprises heating 1-chloroisoquinoline with aniline hydrochloride.

15. A method of preparing 1-(N-ethyl)anilinoisoquinoline which comprises heating 1-chloroisoquinoline with ethyl aniline.

SELBY B. DAVIS.
STUART D. WILLSON.

References Cited in the file of this patent

Mohunta et al.: J. Chem. Soc. (London), 1934, pp. 1263–1264.

J. Chem. Soc. (London), 1948, pp. 779 and 782.

Chem. Abstracts, vol. 34, pp. 7888–7890 (1940).

Sabatier: "Catalysis in Organic Chemistry," (D. Van Nostrand Co., N. Y., 1923), p. 231.